United States Patent [19]
Dickinson III et al.

[11] 3,854,476
[45] Dec. 17, 1974

[54] INTRA-VAGINAL DEVICE AND METHOD
[76] Inventors: Ben Wade Oakes Dickinson III, 2125 Broderick St., San Francisco, Calif. 94115; Robert Wayne Dickinson, 40 Maplewood Dr., San Rafael, Calif. 94901
[22] Filed: Apr. 5, 1973
[21] Appl. No.: 348,204

[52] U.S. Cl............................. 128/138, 119/143
[51] Int. Cl............................................ A01k 21/00
[58] Field of Search.............. 128/138, 79, 132, 1 R, 128/285, 341, 98, 127, 128, 129, 130, 131, 260; 119/143, 144, 145

[56] References Cited
UNITED STATES PATENTS
| | | | |
|---|---|---|---|
| 3,463,141 | 8/1969 | Mozolf | 128/341 X |
| 3,545,439 | 12/1970 | Duncan | 128/260 |
| 3,675,642 | 7/1972 | Lord | 128/1 |
| 3,701,351 | 10/1972 | Harvey | 128/260 |
| 3,712,300 | 1/1973 | Davidowitz | 128/98 |

Primary Examiner—Richard A. Gaudet
Assistant Examiner—G. F. Dunne
Attorney, Agent, or Firm—Flehr, Hohbach, Test, Albritton & Herbert

[57] ABSTRACT

An intra-vaginal device for a female animal (e.g., dog or cat) formed of an elongate member including a barrier means at its posterior means, an extension element at its anterior means and a coupling means therebetween. The device is inserted so that the barrier means is posterior of the vaginal sphincter muscle and the extension element is anterior of the same. The extension element is of sufficient length to orient the device along the normal undistended vaginal axis. With the device used for contraception, the barrier means is of sufficient size to block penile insertion anterior thereof. The device is capable of long-term retention within the vagina and so is also useful as a vaginal drug delivery system.

18 Claims, 3 Drawing Figures

PATENTED DEC 17 1974    3,854,476

3,854,476

INTRA-VAGINAL DEVICE AND METHOD

BACKGROUND OF THE INVENTION

At the present time, the overpopulation of pets, particularly cats and dogs, has become a major social, environmental and health problem. Although the exact population of cats and dogs in the United States is unknown, the American Humane Association has estimated that the population has doubled to more than 65 million from 1968 to 1973. Also, the Humane Society of the United States estimates that approximately 22 kittens and puppies are born in the United States for each human baby. The only known widely accepted technique for controlling the pet population via the female animal is by the surgical technique of spaying. However, this operation is relatively costly and there are insufficient number of veterinarians available to control the pet population in this manner. Another deficiency of this technique is that since it is irreversible, it does not provide the ability for temporary contraception followed by selective breeding within a reasonable time. Another problem of spaying is that it usually permanently modifies the physical and emotional characteristics of the animal.

SUMMARY OF INVENTION AND OBJECTS

The present invention relates to an intra-vaginal contraceptive device and method for long-term implacement in the vagina of a pet or other desired animal.

It is another object of the present invention to provide a device and method of the above type which operates by a partial or total blocking of penile insertion when the animal is in heat during attempted intromission by the male animal.

It is a particular object of the invention to provide a device and method of the foregoing type suitable for use in the female dog.

It is a further object of the invention to provide a device and method of the foregoing type capable of being seated in the female animal's vagina over an extended period of time without harmful side effects.

It is another object of the invention to provide a contraceptive device of the above type for long-term progressive release of a deodorant to mask the odor of the female animal in heat to reduce attraction of the male dog.

It is another object of the invention to provide a device of the above type for long progressive intra-vaginal release of drugs or other chemicals.

Other objects of the present invention will be apparent from the following description taken in conjunction with the accompanying drawing.

In accordance with the above objects, a device is provided for insertion into and long-term retention within the vagina of a female animal of the type having a vagina terminating at the posterior end in a normally closed vulva and at the anterior end in a normally closed cervix and having a defined sphincter muscle therebetween. Such animals are exemplified by human beings, dogs, cats, hogs, horses, sheep, cows, and the like.

The device comprises an elongate member having posterior and anterior ends, preferably with a continuous outer surface. A barrier means, suitably in the form of a generally rounded disc, is disposed to the posterior of the member and is adapted, after vaginal insertion, to contact the vaginal lining posterior to the animal's sphincter muscle. The device also includes an extension element of sufficient length to orient the same generally along the normal undistended vaginal axis.

A coupling means interconnects the extension element and barrier means and is disposed to be seated adjacent the animal's sphincter muscle with the extension element adjacent the animal's cervix. The radial extent of the coupling means is substantially less than the maximum radial extent of either the extension element or the barrier means. The coupling means is preferably sufficiently flexible to permit relative pivotal movement between the extension element and barrier means.

The barrier means comprises a flexible yieldable disc, with a generally flat posterior surface transverse to the axis of the extension element. For the orientation of a dog's vagina, the center of the disc is preferably eccentric with respect to the axis of the extension element in a manner that the under portion of the disc in situ within the animal (herein the lower disc portion) projects further than the corresponding upper disc portion. Also, the principle place of the disc is oblique to the axis of the extension element. The plane preferably forming an angle of about 95° to 115° with the axis of the extension element viewing the intersection therewith of the lower disc portion plane from the anterior side.

The extension element preferably includes a frustoconical portion tapered for increasing radial extent in a posterior direction along the elongate member to form an annular shoulder portion adjacent the coupling means. The shoulder portion preferably abuts against the anterior of the animal's sphincter muscle to assist retention. The taper assists vaginal insertion.

The sizing of each portion of the present contraceptive device is selected to conform to the orientation, size and character of the animal's vagina as set forth more fully hereinafter.

The method of the present invention comprises inserting a device of the foregoing type into the vagina of a female animal (e.g., a dog) for long-term retention and consequent contraception.

The device is particularly effective for dog contraception to block full penile insertion since this normally prevents ejaculation by the male dog. If ejaculation occurs in the animal's vagina posterior to the device, it is so far removed from the cervix and hence the ovaries that conception would be effectively precluded to a high percentage.

The device is positioned so that the maximum radial extent of the extension element is anterior of the animal's sphincter muscle. Also, the anterior of the extension element is proximal the animal's cervix. The barrier means is positioned between the animal's sphincter muscle and vulva. In the foregoing manner, the device is retained in the animal's vagina for a substantial period of time to prevent penile insertion to the anterior of the barrier means.

DETAILED DESCRIPTION OF THE PREFERRED EMBODIMENT

Figure 3:
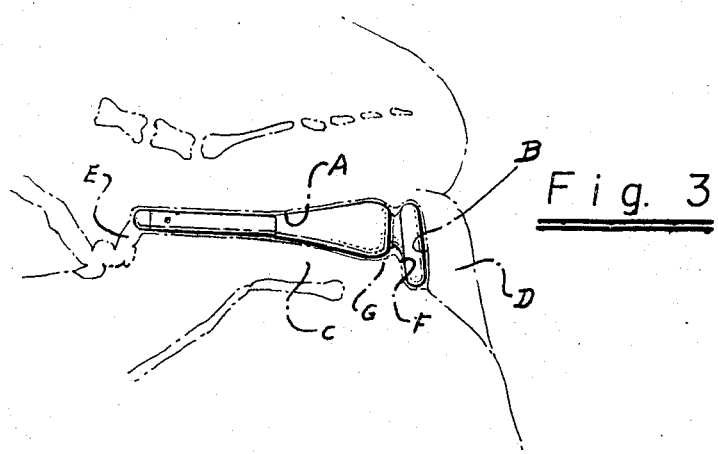
FIG. 3 is a side elevational view of the device of FIG. 1 inserted into the reproductive tract of a female dog with the dog's tract illustrated in phantom.

An intra-vaginal contraceptive device according to the present invention is formed for use in the vagina of a female animal of the type having its vagina terminating at the posterior end in normally closed vulva and at the anterior end in a normally closed cervix. Between these two ends the animal preferably has a defined sphincter muscle. Animals of the foregoing type include dogs, cats, hogs, horses, sheep, cows, and the like. The device is well suited for use in a dog or cat. Although the device illustrated in the drawing and described in detail hereinafter is particularly adapted for use in a dog, it is to be understood that the invention also relates to devices suitable for use in other animals, especially the cat, by appropriate modification to accommodate the difference in internal anatomy of the cat's reproductive tract.

Figure 1:
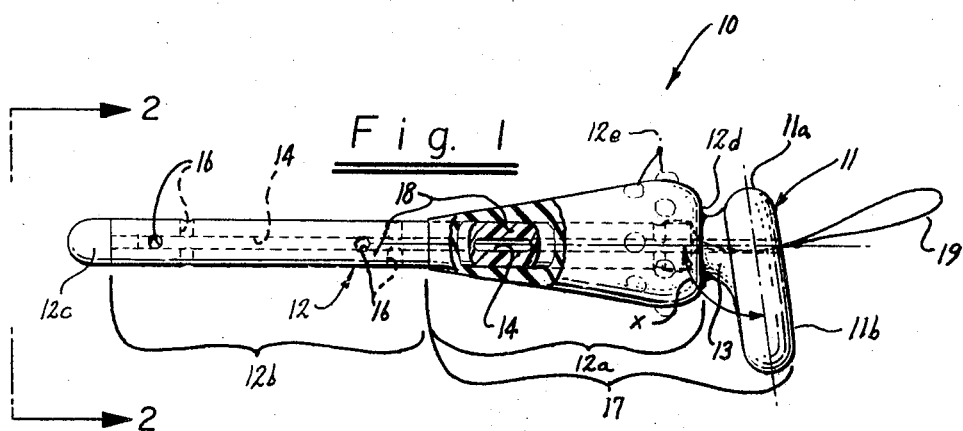
FIG. 1 is a side elevational view of a device according to the present invention.

Referring to FIG. 1, a device according to the present invention is illustrated seated within the animal's relatively flaccid vagina which expands transversely from a relatively flattened shape to conform to the shape of the device. The vagina includes a main vaginal cavity A extending from the posterior end of the cervix and mating with a vestibule cavity B which drapes over the animal's pelvis C at a downwardly disposed angle in relationship to the main vaginal cavity A. The vagina terminates at the posterior end in the vulva D and at the anterior end in the cervix E. Annular sphincter muscle F is disposed in the vaginal wall at the intersection of vaginal cavities A and B. Sphincter muscle F comprises an annular muscular constriction which resists stretching. It has a relatively well-defined maximum and minimum extent in comparison to the remainder of the relatively flaccid vaginal wall. The animal's urethral opening G is in the general vicinity of sphincter muscle F and is usually covered by an overlapping lip.

Referring to the drawing, the contraceptive device of the present invention comprises an elongate member, generally designated by the number 10. It includes means forming a barrier, suitably in the form of disc 11, an extension element 12, and means forming a coupling 13 between said element and barrier means.

For purposes of the present description, reference to anterior, posterior, upper and lower portions of the device relate to said portions in situ within the animal's vagina as illustrated in FIG. 3.

A device of the foregoing type rests to a certain extent in the animal's vagina in the position illustrated in FIG. 3. To avoid irritation during natural movement of the animal's vagina, it is preferable to form elongate member 10 of an essentially continuous outer surface. Also, the device should be formed of a material which is compatable with the animal's reproductive tract such as polyethylene, nylon, or various natural or synthetic rubbers (e.g., silicone rubber of the type produced by Dow Corning Corporation under the name Silastic rubber) depending upon the desired flexibility as explained more fully hereinafter.

The barrier means is disposed at the posterior end of the device and is of a suitable size and shape so that after vaginal insertion, it contacts the vaginal lining between the animal's sphincter muscle and vulva to block full penile insertion anterior thereof. For the anatomy of a dog, the barrier means comprises a disc 11 with a generally rounded periphery 11a to minimize irritation during movement within the animal's vagina. Although periphery 11a may assume a generally circular shape as illustrated in the drawing, it is to be understood that other similar shapes such as an oval may be utilized so long as it generally conforms to the anatomy of the particular animal and does not include sharp pointed edges which could cause irritation during long-term retention. Disc 11 also includes a generally flat posterior surface 11b transverse to the axis of extension element 12. If desired, surface 11b may vary from flatness by, for example, including some concavity or convexity.

To conform to the anatomy of the dog, it has been found that certain specific relationships among the elements of the device improve retention of the device and prevention of full penile insertion anterior of the device. For example, the center of disc 11 is eccentric with respect to the axis of extension element 12. Thus, with the device in position as viewed in FIG. 3, lower and upper disc portions are formed in which the periphery of the former projects substantially from said extension element axis than the periphery of the latter. As illustrated, the periphery of the lower disc portion below the outer radial extent of the extension element 12 while the upper disc periphery projects approximately the same as or less than the maximum radial projection of the extension element. For reasons to be explained hereinafter disc 11 includes a portion with a radial projection substantially greater than the maximum radial projection of extension element 12.

Another feature of disc 11 particularly adapted to the dog's anatomy is that the principle plane of the disc is oblique to the axis of the extension element. For example, the principle plane of the disc suitably forms an angle X of about 95° to 115° with the axis of extension element 12 viewing the intersection therewith of the lower disc, and preferably an angle of about 98° to 105°. Angle X is measured from the intersection of the plane of the lower disc portion of said plane with the extension element viewed from the anterior side. The above disposition of disc 11 apparently assists retention of the device and also prevention of full penile insertion while simultaneously reducing irritation of the adjacent vaginal wall, as explained more fully hereinafter.

It is preferable to form disc 11 of a flexible material, such as natural or artificial rubber (e.g., silicone rubber of the Silastic type) which is sufficiently pliable to prevent pressure necrosis, irritation or tissue bruising to the contacted area of the vaginal tract during movement of the device by the animal.

Coupling means 13 which interconnects extension element 12 and disc 11 comprises a neck-like portion disposed to be seated adjacent sphincter muscle F when the extension element is adjacent the animal's cervix E. It has a radial extent substantially less than the maximum radial extent of either disc 11 or extension element 12. The length of coupling means 13 is at least equal to the length of the animal's vaginal sphincter muscle where it is seated. On the other hand, in order to position disc 11 between the sphincter muscle F and to position the posterior shoulder of extension element 12 adjacent the anterior side of the same muscle, coupling means 13 is preferably not substantially longer than the same muscle.

Coupling means 13 is suitably formed of the same material as disc 11, sufficiently flexible to permit relative pivotal movement between extension element 12 and disc 11. In this manner, surface 11b is permitted to stay generally adjacent the animal's vulva while the animal changes the dimensions of the vulva in accordance with natural tract movement. This minimizes irritation while enabling disc 11 to be an effective barrier to penile insertion anterior thereof during such movement.

In the illustrated embodiment, the exterior surface of extension element 12 comprises a tapered frusto-conical portion 12a mounted to a generally tubular or cylindrical portion 12b and terminating at its anterior end in a generally rounded cap 12c mounted as set forth hereinafter. The frusto-conical portion 12a is tapered for increasing radial extent in a posterior direction in order to assist vaginal insertion through the vaginal sphincter muscle F. It preferably has a maximum radial extent adjacent coupling means 13 to form a posteriorly directed annular shoulder portion 12d adapted to abut against the animal's sphincter muscle to assist in preventing spontaneous expulsion of the device by the animal. For this purpose, the shoulder portion is formed to be larger than the animal's sphincter muscle in a relaxed state requiring a certain stretching of the same muscle during insertion.

For certain animals with weak sphincter muscles, such as highly multiparous ones, it has been found useful to form portion 12a of extension element 12 to include a plurality of spaced apart protuberances (e.g., bumps 12e). In another embodiment, not shown, such protuberances are spaced apart ridges. The protuberances assist engagement with the sphincter muscle.

The total length of extension element 12 is less than the distance between animal's cervix and sphincter muscle and comprises the major portion of the length of elongate member 10. Element 12 is of sufficient length to orient the device generally along the normal undistended vagina as illustrated in FIG. 3.

To prevent excessive distortion of element 12, it is formed to be relatively stiff and shape-retaining in comparison to flexible disc 11. Individual portions of element 12 may be flexible so long as there is a support portion or backbone which accomplishes the desired stiffness. By retaining the vagina in a relatively straight configuration, shoulder portion 12b abuts against the annular sphincter for firm retention. Also, the above length of the device causes the anterior end thereof to be generally adjacent to the cervical area to form a backstop against forcing of disc 11 anteriorly past the sphincter muscle in response to pressure exerted against disc 11 during attempted anterior penile insertion.

Since the device rests in the vagina, it does not form a seal with any portion of the same against movement of vaginal secretions posteriorly from the animal. Thus such fluids usually are able to freely bypass the device and flow out the vulva without stagnation which might otherwise result in infection. The device is also provided with a drain passage 14 extending from cap 12c continuously through the elongate member to an exit opening in disc 11. A plurality of transverse drain openings 16 are provided in tubular portion 12b to intersect drain passage 14. Thus, vaginal secretions are permitted to pass from one side to the other of the device or posteriorly along drain passage 14.

In the illustrated construction of the foregoing device, the stiffness of extension element 12 is provided by utilizing a hollow, plastic tube 18 (e.g., low density polyethylene) projecting from cap 12c to coupling means 13. Cap 12c is suitably mounted to tube 18 by frictional engagement and may be formed of a flexible material such as silicone rubber to prevent harmful irritation during attempted intromission. In this configuration, disc 11, coupling means 13 and the tapered portion 12a of extension element 12 are formed into an integrally cast flexible piece 17. Tapered portion 12a includes an internal cylindrical passage of sufficient diameter to receive part of tube 18. The receiving passage suitably narrows adjacent coupling means 13 into the posterior end of drain passage 14 and forming a seat supporting the posterior end of tube 18. The portion of tube 18 posterior to tapered portion 12a forms tubular portion 12b set forth above. Tubular portion 12b is suitably mounted to piece 17 as by adhesive material or frictional engagement with the anterior after force-fitting of tube 18. A cord 19 may be attached to tube 18 as be passage through a transverse hole in the posterior thereof and through drain passage 14 out the posterior of member 10 to provide a handle for ready device removal. By pulling on cord 19, there is a direct connection to tube 18 avoiding the problem of disengaging the same on device removal.

In the above embodiment, drain passage 14 is formed by the hollow interior of tube 18 mating with an opening in piece 17 which opening terminates at the posterior end thereof. Communication with the vaginal fluids is via transverse openings 16 extending through tube 18.

It is preferable to custom fit a device of the foregoing to conform to the particular anatomy of the individual female animal. For example, tube 18 may be fitted into the animal's vagina until it touches the cervical area of the same to provide a measure of the length of the device. With suitable adjustment, tube 18 may be severed and fit with rubber piece 17 for a device of the desired length. Also, the proper one of a number of different sized integral pieces 17 may be selected in a trial-by-error method for determining the appropriate one for the particular animal's physiology. The gauging of the diameter of the frusto-conical portion 12b may also be performed by trial and error. As set forth hereinafter the desired size is the largest one that will fit through the animal's sphincter muscle F. Thus different conical portions are inserted past the sphincter muscle until one is too large to fit therethrough. The size of the device is selected to be the next smaller one in series.

Figure 2:
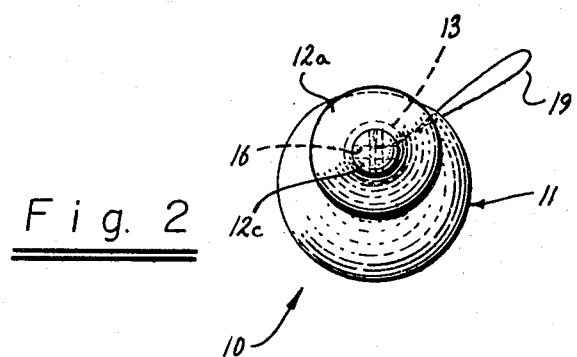
FIG. 2 is an end view of the device of FIG. 1 taken along the line 2—2.

The foregoing device is sized to permit firm but comfortable long-term retention of the same while preventing spontaneous expulsion by a peristaltic movement of the animal. The device illustrated in FIGS. 1 and 2 is approximately full size for a typical dog with an average sized vagina. It is inserted through the animal's vulva D a sufficient distance to permit closure of the same. The device is sized so that the anterior end, cap 12c, is adjacent the anterior end of the vagina in the general vicinity of the cervix E.

The length of extension element 12 is selected to be slightly less than the distance between cervix E and sphincter muscle F. For most animals, this comprises the major portion of the length of elongate member 10.

As set forth above, the maximum radial extent of extension element 12 is preferably disposed adjacent neck-like coupling means 13 to form a shoulder 12d. It is apparent that this maximum radial extent can be no larger than the maximum distended diameter of sphincter muscle F since otherwise it could not pass to the anterior side thereof, essential to retention of the device. As set forth above, sphincter muscle E is an annular muscular constriction within the vagina which normally has a relatively firm radial extent in comparison to the remainder of the relatively flacid vagina. For firm retention, the maximum radial extent of extension element 12 is larger than the minimum undistended diameter of sphincter muscle F. In this manner, once shoulder 12d passes to the anterior of the sphincter muscle, it can abut against the muscle to resist peristaltic movement by the animal to spontaneously force the device posteriorly through the vulva B.

Coupling means 13 is preferably a neck-like portion of reduced diameter in comparison to the maximum radial extent of extension element 12 and of disc 11. For the animal's comfort, it is preferable to construct the device so that coupling means 13 is adjacent sphincter muscle F with cap 12c adjacent cervix E and disc 11 in vestibule cavity A. Since the coupling means is of reduced diameter, this assists in avoiding the harmful side effects (e.g., pressure necrosis) of excessive pressure exerted against the sphincter muscle over an extended period of time. Furthermore, by permitting the device to rest comfortably, the animal has a reduced tendency to peristaltically or otherwise urge the device in a posterior direction out of the vagina. For the above purpose, the outer radial extent of coupling means 13 is preferably no larger than the normal radial extent of sphincter muscle E. It is preferable that coupling means be at least as long as sphincter muscle 13 for comfortable seating. On the other hand, assuming elongate member 10 is of the desired size so that cap 12c is adjacent to cervix E and disc 11 is adjacent the anterior side of the vulva, it is preferable that the length of coupling means 13 be less than a distance which would cause shoulder 12d to be positioned substantially anterior of the sphincter muscle. In other words, within the above limits, coupling means 13 should be relatively short so that shoulder 12d is relatively close to and thus capable of abutting against sphincter muscle F. If coupling means 13 were substantially larger than this, the animal could peristaltically or otherwise urge elongate member posteriorly until shoulder 12d contacted the sphincter muscle which might project disc 11 into the vulva to open the same. For long-term retention of the device it would be undesirable for the vulva to be opened by the device since this would open the vagina to harmful bacteria and debris. Also, such positioning could provide an opening for intromission.

The size, shape and orientation of disc 11 has been established by substantial experimentation. The embodiment of the device illustrated in FIGS. 1-3, especially disc 11, is particularly adapted to conform to the anatomy of the dog. For this purpose, as set forth above, the center of disc 11 is eccentric with respect to the axis of extension element 12. This eccentricity is such that, with the device in place as illustrated in the drawing, the lower portion of the disc 11 projects downwardly substantially more than the maximum projection of extension element 12. With the device in illustrated position, the upper portion of disc 11 has a radial extent about the same as or slightly smaller than the maximum extent of shoulder 12. It has been found that this configuration minimizes irritation of the vestibule B in contact with the upper portion of disc 11.

The periphery 11a of disc 11 has a maximum radial extent no larger than the maximum distended diameter of vulva D so it can pass therethrough. On the other hand, it is preferable that disc 11 be larger than the maximum distended diameter of sphincter muscle so that, upon attempted intromission, sphincter muscle F provides the necessary resistance to prevent full penile insertion to the anterior of disc 11.

Another feature of the device particularly adapted to the physiology of the dog is that the principle place of disc 11 is oblique to the axis of extension element 12. This is to permit comfortable seating of the disc in vestibule B so that surface 11b generally is aligned with the vulva. For this purpose, it has been found that a suitable angle between the principle plane of the disc and the axis of extension element 12 is from about 95° to 115° (preferably from 75° to 82°).

The present device takes advantage of the orientation of the dog's vagina which has an obtuse angle between main cavity A and vestibule B viewed from the underside of the vagina illustrated in FIG. 3. For example, the substantial length and relative stiffness of extension element 12 prevents the dog from peristaltically or otherwise forcing the device posteriorly out of the vagina. For removal, that element must change directions as it passes over pelvis C into the vestibule region B. Also, positioning the posterior end of extension element 12 adjacent cervix E permits it to act as a backstop to prevent anterior movement of disc 11 in response to attempted intromission.

The device is particularly effective for dog contraception to block full penile insertion since this normally prevents ejaculation by the male dog. If ejaculation occurs in the animal's vagina posterior to the device, it is so far removed from the cervix and hence the ovaries that fertilization and conception would be effectively precluded by lack of sperm survival in a high percentage of cases.

Devices of the foregoing type have been found to be highly effective in terms of long-term retention without harmful side effects. It has been found that the retention rate in dogs of a certain type is less than that of other dogs. For example, the device is less effective in very young dogs because of the extremely limited size of the reproductive tract. Also, multiparous dogs do not retain the device as effectively because of the enlargement and increased flaccidity of the sphincter muscle. Thus, the best results are obtained with a dog from a time just prior to puberty to maturity without being multiparous. Certain genetically defective dogs and spayed dogs tend to reject the device in a relatively high percentage of cases. If a dog substantially increases in size after insertion of an initial device, it may be advisable to refit a larger device.

In one embodiment of the present invention, means for progressively releasing a fluid chemical (e.g., a drug, hormone, or deodorant) into the vagina may be carried by the foregoing device. Such means may comprise the formation of the wall of piece 17 from a microporous material such as silicone rubber of the Silastic type. The fluid chemical is incorporated into the wall prior to vaginal insertion for slow, long-term release thereafter.

One method of using the release means in the above device for contraception is for long-term release of a deodorant to mask the odor of a female animal in heat. This considerably reduces attraction of the male animal to the female.

The foregoing release means also adapts the present device for uses other than contraception. That is, since the device is capable of long-term retention, fluid, drugs, hormones, or other chemicals may be progressively released intra-vaginally over extended periods of time. This is advantageous for certain animal treatments.

It is apparent from the foregoing that an effective intra-vaginal device has been provided which is particularly well adapted for contraception, especially in the dog. It is also useful as a long-term, intra-vaginal drug or other chemical delivery device. It should be understood to those of ordinary skill that certain modification of the shape, size, and orientation of the above device would render the same effective for utilization in other animals such as the cat. It is further apparent that other modifications of the device may be made, such as forming elongate member 10 integrally or in many different parts, without departing from the scope of the present invention. Also, drain passage 14 is not essential where there is sufficient clearance around the device to permit the vaginal secretions to freely bypass the same.

We claim:

1. An intra-vaginal contraceptive device comprising an elongate member having posterior and anterior ends, the periphery of said device being free of sharp edges, said elongate member including an extension element, a disc disposed at the posterior of said extension element and transverse to the extension element, means forming a coupling between said extension element and disc, the combination of said disc and coupling means being sufficiently flexible to permit substantial pivotal movement of said disc relative to said extension element, said last named element including a substantial portion which is relatively stiff and shape-retaining in comparison to said disc and which is disposed to the anterior of the device, said extension element comprising the major portion of the length of said elongate member and being of sufficient length and rigidity to orient said device generally along the animal's undistended vaginal axis.

2. A device as in claim 1 in which said elongate member is formed of an essentially continuous outer surface.

3. A device as in claim 1 in which the outer perimeter of said coupling means is substantially less than the maximum perimeter of said extension element and barrier means.

4. A device as in claim 1 in which the disc includes a generally flat posterior surface transverse to the axis of said extension element.

5. A device as in claim 1 in which the center of said disc is eccentric with respect to the axis of said extension element and in which upper and lower disc portions are defined with the device in position in the animal's vagina, the periphery of said lower disc portion projecting substantially further from said extension element axis than the periphery of said upper disc portion.

6. A device as in claim 1 in which the principle plane of said disc is oblique to the axis of said extension element.

7. A device as in claim 6 in which the principle plane of said disc forms an angle of about 95° to 115° with the axis of said extension element viewing the intersection therewith of the lower disc portion plane from the anterior side.

8. A device as in claim 1 in which said disc includes a portion with a radial projection substantially greater than the maximum radial projection of said extension element.

9. A device as in claim 1 in which said disc has a perimeter substantially larger than the maximum perimeter extent of said extension element.

10. A device as in claim 1 in which said extension element includes a frusto-conical portion tapered in increasing radial extent in a posterior direction along said elongate member for assisting vaginal insertion of said device.

11. A device as in claim 1 together with means for the prolonged release of fluid substances.

12. A device as in claim 11 in which said release means comprises forming a portion of the surface of said elongate member from a microporous material.

13. In a method of contraception employing long-term vaginal retention of a contraceptive device in an animal of the type having a vagina terminating at the posterior end in a normally closed vulva and at the anterior end in a normally closed cervix and having a defined sphincter muscle therebetween, utilizing the contraceptive device which includes an elongate member with an extension element, a flexible posterior disc, and coupling means therebetween, the steps of inserting the device totally within the animal's vagina with said extension element lying along the vaginal axis and with the disc posteriorly directed and contacting the vaginal wall about its periphery adjacent the sphincter muscle which inhibits insertion of the penis of the male, and permitting bypass of fluids, and retaining said device in said inserted position in the animal's vagina with flexing of the disc responsive to movement of the vagina for a substantial period of time for contraception.

14. A method as in claim 13 in which the animal is a dog.

15. A method as in claim 13 including the step of releasing a fluid chemical from said device into the vagina of the animal over an extended period of time.

16. A method as in claim 15 in which the fluid chemical is a deodorant adapted to mask the odor of the female animal in heat.

17. A method as in claim 15 in which the fluid chemical is a drug.

18. A method as in claim 15 in which the device includes a microporous portion and the fluid chemical is released over a prolonged time therefrom.

* * * * *